United States Patent Office 3,428,292
Patented Feb. 18, 1969

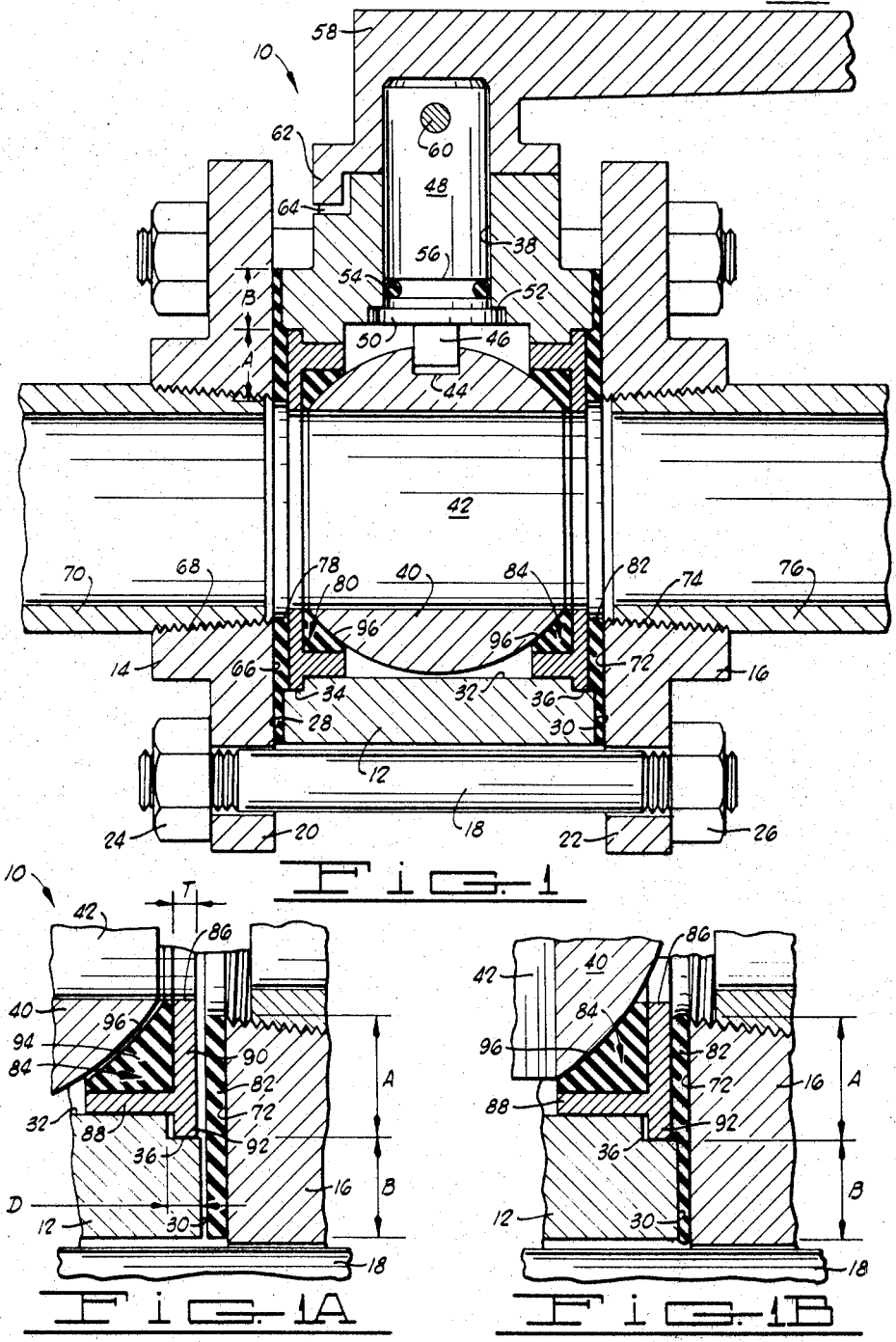

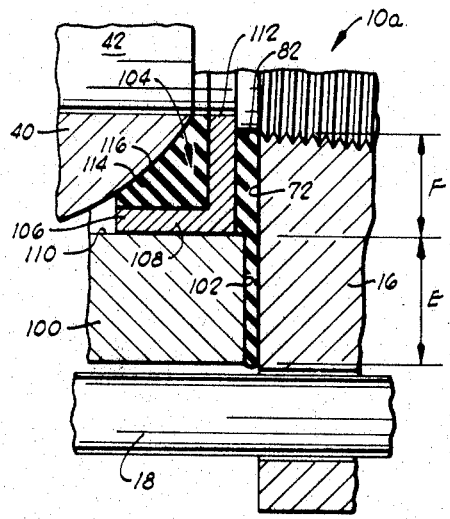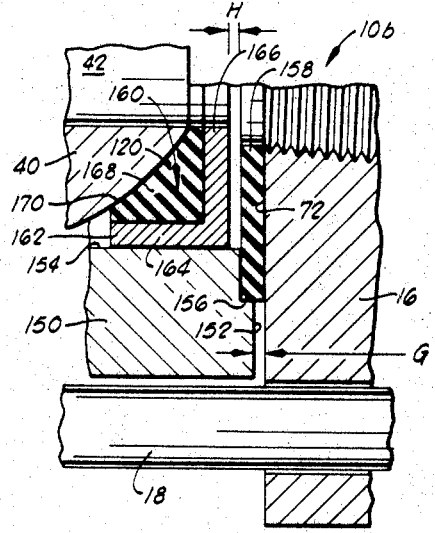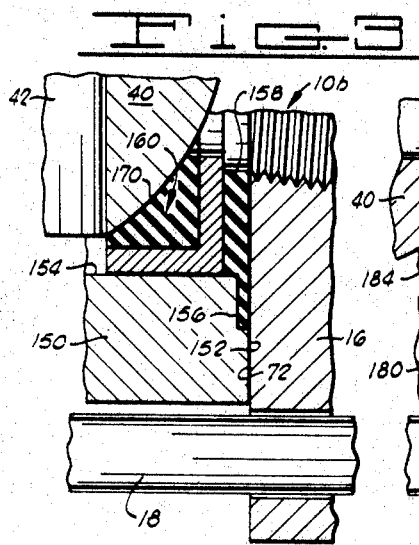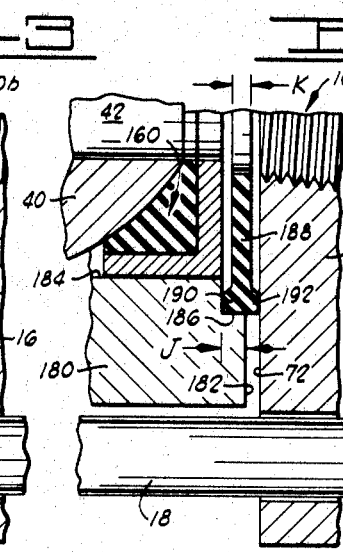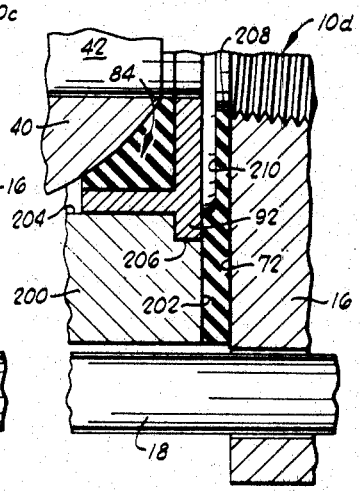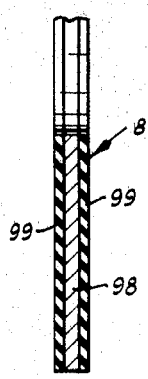

3,428,292
UNSTRESSED SEATS FOR BETWEEN
FLANGE VALVES
Domer Scaramucci, Oklahoma City, Okla., assignor to
Balon Corporation, Oklahoma City, Okla., a corporation of Oklahoma
Filed Jan. 3, 1966, Ser. No. 526,936
U.S. Cl. 251—151                              3 Claims
Int. Cl. F16k 5/06, 25/00; F16l 29/00

ABSTRACT OF THE DISCLOSURE

A valve including a body having an upstream and downstream end face and a bore between the end faces. A valve member is movably positioned in the bore in the body for opening and closing the bore. An annular seat-seal member disposed in the valve body encircles the bore and includes a resilient sealing element which sealingly engages the valve member, and a rigid annular member which bears against the valve body around the bore. An annular seal member sealingly contacts one of the end faces of the valve body, and also contacts the rigid annular member of the seat-seal member. A connecting member having a central aperture therethrough which is aligned with the bore sealingly engages the seal member and deforms a portion of the annular seal member inwardly in the bore toward the valve member.

This invention relates generally to improved valves. More particularly, but not by way of limitation, this invention relates to improved seats and seals for use in between flange valves.

Previously constructed ball valves for use between flanges, that is between flanged connecting members, generally include a valve body having a passageway extending therethrough, a valve member movably positioned in the passageway and at least one annular seal member disposed in the passageway and having a surface thereon arranged to sealingly engage the valve member. The connecting flanges are disposed on each end of the valve body and are connected therewith by a plurality of threaded fasteners that extend between the flanges of the connecting members.

Frequently, an annular metal ring having one surface in engagement with the annular seal member and the other end in engagement with the flanged connecting member adjacent the seal member is used to confine the annular seal member to prevent extension of the seal under the influence of pressure in the valve. As the threaded fasteners are tightened to hold the valve assembled, the metal ring forces the seal into engagement with the valve member. The inward movement of the metal ring, as the flanges are tightened during assembly with the valve body, often distorts the seal members to such an extent that the seal members are permanently deformed and, therefor, will not form an effective seal with the valve member. Sometimes the force exerted on the valve member is so large that the valve member is extremely difficult to move between the open and closed positions in the valve body.

Generally, this invention contemplates a valve comprising: a valve body having an upstream end face, a downstream end face, and a bore extending therethrough intersecting the end faces; a valve member movably located in the valve body, the valve member being movable from a position opening the bore to a position closing the bore; a first annular seal member disposed in the valve body encircling a portion of the bore, the seal member having a surface thereon arranged to sealingly engage the valve member; a second annular seal member in juxtaposition with and sealingly engaging at least a portion of one of the end faces and the first annular seal member; and, a connection member having an opening therethrough in alignment with the bore and sealingly engaging the second annular seal member, the connection member deforming a portion of the second annular seal member to bias the first annular seal member toward the valve member.

One object of the invention is to provide an improved valve for use between connecting members that provides for the initial sealing engagement between the seal member and valve member without distorting the seal member.

Another object of the invention is to provide an improved valve for use between connecting members that provides a fluidtight seal between the valve body and the adjacent connecting member.

One other object of the invention is to provide an improved valve for use between connecting members that is constructed to provide sufficient initial engagement between the seal and valve member to initiate a fluid-tight seal, but that avoids the exertion of undue force on the seal and valve member.

Still another object of the invention is to provide an improved valve for use between connecting members that simultaneously provides for the initial sealing engagement between the seal and valve member, forms a fluidtight seal between the valve body and connection member, and avoids the exertion of undue force on the valve member.

One further object of the invention is to provide an improved valve for use between connecting members wherein the force exerted by the connecting members on the valve body, during assembly of the connecting members with the valve body, is exerted almost entirely on the valve body in compression.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball vave constructed in accordance with the invention;

FIG. 1A is an enlarged, fragmentary cross-sectional view illustrating the structure of a portion of the ball valve of FIG. 1;

FIG. 1B is an enlarged, fragmentary cross-sectional view similar to FIG. 1A, but illustrating the various parts shown therein in the assembled condition with the valve member moved to the closed position;

FIG. 2 is an enlarged, fragmentary cross-sectional view of a modified arrangement of a seal member located in the ball valve of FIG. 1;

FIG. 3 is a view similar to FIG. 1B, but illustrating another embodiment of seal member disposed therein;

FIG. 4 is a view similar to FIG. 3, but illustrating still another embodiment of seal member that may be utilized in the ball valve of FIG. 1;

FIG. 4A is a view similar to FIG. 4, but illustrating the various parts thereof in the assembled condition with the valve member in the closed position;

FIG. 5 is an enlarged, fragmentary cross-sectional view of still another embodiment of seal member that may be utilized in the ball valve of FIG. 1; and, FIG. 6 is an enlarged, fragmentary cross-sectional view of an additional embodiment of seal member that can be utilized in the ball valve of FIG. 1.

Embodiment of FIG. 1

Referring to the drawings and to FIG. 1 in particular, shown therein and generally designated by the reference character 10 is a ball valve constructed in accordance with the invention. The ball valve 10 includes a valve body 12, an upstream connecting member 14, and a downstream connecting member 16. The valve body 12, upstream connecting member 14 and downstream connecting member 16 are held assembled by a plurality of threaded fasteners 18 that extend through flanges 20 and 22 on the upstream and downstream connecting members 14 and 16, respectively. Each of the threaded fasteners 18 is provided with a pair of threaded nuts 24 and 26 that engage, respectively, the flanges 20 and 22.

The valve body 12 includes an upstream end face 28, a downstream end face 30 and a bore 32 extending therethrough intersecting the upstream and downstream end faces 28 and 30. Counterbores 34 and 36 are formed in the valve body 12 adjacent the end faces 28 and 30, respectively. An aperture 38 extends transversely through the valve body 12 intersecting the bore 32 for purposes that will become more apparent hereinafter.

A spherical valve member, that is, a valve ball 40, is movably disposed in the bore 32 of the valve body 12. The valve ball 40 has a port 42 extending therethrough and has a rectangular recess 44 formed in the exterior surface thereof. The exterior recess 44 is sized to receive a rectangular end 46 formed on the lowermost end portion of a valve operating member 48. The recess 44 is longer than the end 46 to permit movement of the valve ball 40 in a direction parallel to the bore 32 when the valve ball 40 is in the closed position.

The valve operating member 48 extends through the transversely extending aperture 38. In addition to the rectangular end 46, the valve operating member 48 includes an exterior flange 50 that engages a downwardly facing surface 52 in the valve body 12 encircling the aperture 38 to limit the upward movement of the valve operating member 48 in the aperture 38. An O-ring seal 54 is disposed in an annular recess 56 formed in the valve operating member 48 and is arranged to provide a fluid-tight seal between the valve body 12 and the valve operating member 48 in the aperture 38.

An operating handle 58 is connected with the upper end of the valve operating member 48 by a pin 60. The operating handle 58 includes a lug portion 62 that is engageable with a pair of abutments 64 (only one is shown in FIG. 1) to limit the rotational movement of the operating handle 58 and the interconnected valve ball 40 to approximately 90 degrees.

The upstream connecting member 14 also includes an end face 66 and a threaded opening 68 that extends therethrough. The threaded opening 68 is sized and arranged to receive the threaded end of a conduit 70. The opening 68 is, as shown in FIG. 1, axially aligned with the bore 32 extending through the valve body 12.

The downstream connecting member 16 includes an end face 72 and a threaded opening 74 that extends therethrough. The threaded opening 74 is sized and arranged to receive the threaded end of a conduit 76. The opening 44 is also axially aligned with the bore 32.

An annular upstream seal 78 is disposed in the valve 10 between and in juxtaposition with the end face 28 on the valve body 12 and the end face 66 on the upstream connecting member 14. An annular upstream seat-seal 80 is disposed in the bore 32 of the valve body 12 between the annular upstream seal 78 and the valve ball 40.

An annular downstream seal 82 is disposed in the valve 10 between and in juxtaposition with the end face 30 on the valve body 12 and the end face 72 on the downstream connecting member 16. An annular downstream seat-seal 84 is disposed in the bore 32 of the valve body 12 between the annular downstream seal 82 and the valve ball 40.

The annular seals 78 and 82 are identical in construction and are shown more clearly in FIGS. 1A and 1B. Also, the upstream and downstream annular seat-seals 80 and 84 are identical in construction though oppositely disposed in the valve 10. The structure of the seat-seals 80 and 84 is also more clearly illustrated in FIGS. 1A and 1B.

FIG. 1A illustrates a portion of the components of the valve 10 in the unstressed condition of the seal 82 and the seat-seal 84, that is, the nuts 24 and 26 have not been tightened on the threaded fasteners 18 to the extent that the downstream connecting member 16 is tightly assembled with the valve body 12. As shown clearly therein, the seal 82 is an annular member having a generally rectangular cross section. The seal 82 is preferably constructed from a resilient material.

The seal 82 is disposed between the downstream connecting member 16 and the valve body 12 in such a position that one annular portion thereof designated by the reference character A engages the end face 72 of the downstream connection member 16 and the seat-seal 84. An outer annular portion, designated by the reference character B, is disposed between the end face 72 on the downstream connecting member 16 and the end face 30 of the valve body 12.

Due to the identity of construction of the seat-seals 80 and 84, only the seat-seal 84 will be described in detail, it being understood that like reference characters apply to like parts in the upstream seat-seal 80. As clearly shown in FIG. 1A, the seat-seal 84 includes the generally L-shaped reinforcing member 86 that is preferably constructed from a relatively rigid material. The reinforcing member 86 includes a horizontal portion 88 having an outside diameter sized to slidably fit within the bore 32 and a radially inwardly extending portion 90 having a thickness T. It will be noted that the reinforcing member 86 also includes a relatively small radially outwardly extending portion 92 also having the thickness T that projects into the counterbore 36. The thickness T of the flange portion 92 is substantially less than the depth D of the counterbore 36 for purposes that will become more apparent hereinafter.

The seat-seal 84 also includes an annular seal member 94 that is disposed within the L-shaped reinforcing member 86. The seal member 94 has a surface 96 thereon configured to sealingly engage the outer surface of the valve ball 40. In the preferred form of the invention, the seal member 94 is constructed from a resilient material that is compatible with the fluid flowing through the valve 10, such as natural or synthetic rubber or one of the resilient synthetic resins.

*Operation of the embodiment of FIG. 1*

With the valve 10 assembled as illustrated in FIG. 1, that is, with the valve ball 40 rotated to the position wherein the port 42 extending therethrough is alined with the bore 32 in the valve body 12, fluid flows through the valve 10. Also, it can be seen in FIG. 1 that tightening the nuts 24 and 26 on the threaded fasteners 18 to securely assemble the upstream and downstream connecting members 14 and 16 with the valve body 12 deforms the seals 78 and 80 in the area B to form a fluid-tight seal between the upstream and downstream connecting members 14 and 16 and the valve body 12. The seals 78 and 80 are also deformed to force the annular portion of the seals 78 and 80 in the area A into engagement with the seat-seals 80 and 84. When this occurs, the seat-seals 80 and 84 are biased toward the valve ball 40, moving the surfaces 96 thereon into initial engagement with the exterior of the valve ball 40. Thus, rotation of the valve ball 40 to the closed position, that is, to a position wherein the port 42 extending through the valve ball 40 is disposed at 90 degrees to the bore 32, an initial sealing engagement is present between the surfaces 96 on the seat-seals 80 and 84 and the valve ball 40.

Fluid pressure, for example in the conduit 70 on the upstream side of the valve 10, exerts a force on the valve ball 40, moving the valve ball 40 relatively downstream by virtue of the loose interconnection between the rectangular end 46 and the rectangular recess 44 in the valve ball 40 to the position illustrated in FIG. 1B. As clearly shown therein, movement of the valve ball 40 downstream with the exterior thereof in engagement with the surface 96 on the seat-seal 84 moves the seat-seal 84 toward the downstream connecting member 16 further deforming the downstream seal 82 to provide a fluid-tight seal between the downstream seal 82 and the downstream end of the seat-seal 84. Thus, it can be appreciated from viewing FIG. 1B that a fluid-tight downstream seal is effected in the valve 10 due to the sealing engagement between the surface 96 on the seat-seal 84 and the valve ball 40 and between the seat-seal 84 and the annular downstream seal 82. Manifestly, no fluid can escape from the valve 10 between the valve body 12 and the downstream connecting member 16 due to the seal 82 that is disposed therebetween.

It should be pointed out that the provision of the annular seals 78 and 82 in conjunction with the movable seat-seals 80 and 84, permit the reduction of required tolerances for constructing the ball valve 10 since the resiliency of the materials forming the seals 78 and 82 permits deformation thereof to compensate for minor deviations from required tolerances. Furthermore, it can be clearly seen in FIGS. 1 and 1B that the initial seal formed upon assembled of the valve 10 will not distort the seat-sals 80 and 84 due to the rather large area of engagement between the annular seals 78 and 82 with the seat-seals 80 and 84. Also, since a relatively small amount of deformation actually takes place, the biasing force exerted by the area A of the seals 78 and 82 on the seat-seals 80 and 84 due to the rather large area of distort or deform the seat-seals 80 and 84. Thus, a ball valve 10 constructed in accordance with the invention avoids the imposition of distorting forces on the seat-seals 80 and 84 and, yet, provides an effective, fluid-tight downstream seal between the valve ball 40 and the downstream seat-seal 84 while at the same time providing a fluid-tight seal between the seat-seal 84 and the downstream seal 82, and between the valve body 12 and the downstream connecting member 16.

FIG. 2 illustrates an alternate embodiment of annular seal that can be utilized in the ball valve 10. The annular seal illustrated in FIG. 2 is designated by the reference character 82a and includes an annular rigid member 98 disposed between a pair of resilient annular members 99.

The resilient annular members 99 are of sufficient thickness and resiliency to provide effective sealing between the valve body 12 and the connecting members 14 and 16 as well as permitting deformation of the annular seal 82a to bias the seat-seals 80 and 84 toward the valve ball 40. Manifestly, the presence of the relatively rigid member 98 does not permit the same magnitude of deformation that is present in the seals 78 and 82, but does permit sufficient deformation to provide an effective, fluid-tight closure of the valve 10.

The seals 82a are normally used where it is anticipated that extremely high pressures may be encountered by the valve 10. The rigid member 98 provides additional reinforcing to support the seat-seals 80 and 84. Also, it should be pointed out that the manufacturing tolerances in the valve 10, when utilizing the seal 82a, are necessarily somewhat closer than when using a seal composed entirely of resilient material such as the seals 78 and 82.

*Embodiment of FIG. 3*

FIG. 3 illustrates in detail the structure of a modified form of the valve 10 generally designated by the reference character 10a. The identical parts used in the valve 10a are designated by the same reference characters used in the description of the ball valve 10.

The ball valve 10a includes a valve body 100 having an end face 102 thereon. It will be understood that the opposite end of the valve body 100 (not shown) may be constructed as illustrated either in FIG. 1 or 3.

As clearly shown in FIG. 3, the valve 10a includes the annular resilient seal 82 that is disposed between the end face 102 of the valve body 100 and between the end face 72 of the downstream connecting member 16. The seal 82 also engages a modified form of downstream seat-seal generally designated by the reference character 104.

As illustrated, the seat-seal 104 includes an L-shaped reinforcing member 106 having a generally horizontal portion 108 that has an outer diameter sized to fit within a bore 110 extending through the valve body 100. The reinforcing member 106 also includes a radially inwardly projecting portion 112 that is in engagement with the annular seal 82. A resilient annular member 114 is disposed within the reinforcing member 106 and has a surface 116 thereon configured to sealingly engage the exterior surface of the valve ball 40.

The valve 10a is very similar to the valve 10 with the exception that the valve body 100 is not provided with a counterbore, such as the counterbores 34 and 36 formed in the valve body 12, nor does the reinforcing member 106 include an outwardly projecting radial flange such as the flange 92 illustrated clearly in FIG. 1A. Thus, the seat-seal 104 is free to slide within the bore 110 in either direction.

As illustrated in FIG. 3, the seal 82 is in juxtaposition with and engages the end face 102 of the valve body 100 and the end face 72 of the downstream connecting member 16 over an area E. The seal 82 is compressed or deformed between the end faces 72 and 102 across the area E due to the force exerted thereon by the threaded fasteners 18.

As the threaded fasteners 18 are tightened, the seal 82 is deformed over an area F by the end face 72 of the downstream connection member 16 to bias the seat-seal 104 relatively toward or into initial sealing engagement with the valve ball 40 as previously described in connection with the valve 10.

Operationally, the valve 10a functions in precisely the same manner as did the valve 10, except that the upstream seat-seal (now shown) is free to follow the movement of the valve ball 40 downstream since there is no radial flange portion to limit the movement thereof. Thus, the upstream seat-seal (not shown) of the embodiment of FIG. 3 may form a fluid-tight upstream seal with the valve ball 40 if the portion 108 of the reinforcing member 106 fits sufficiently close within the valve body 100 to prevent leakage therebetween.

*Embodiment of FIG. 4*

FIG. 4 illustrates another embodiment of ball valve generally designated by the reference character 10b. The ball valve 10b includes many identical parts to the ball valve 10 and the identical parts are designated by the same reference characters used in describing the ball valve 10.

The ball valve 10b includes a valve body 150 having an end face 152 and a bore 154 extending therethrough intersecting the end face 152 and the opposite end face (not shown). A counterbore 156 is formed in the valve body 150 adjacent the end face 152. Disposed in the counterbore 156 adjacent and in juxtaposition with the end face 72 on the downstream connecting member 16 is an annular resilient seal 158.

The seal 158 is similar in construction to the seals 78 and 82, but has a smaller outside diameter, that is, the seal 158 has an outside diameter equal to the diameter of the counterbore 156. The seal 158 may be constructed from a softer material than the seals 78 or 82 since the seal 158 does not carry the compressive load exerted by the fasteners 18 when the valve 10b is tightly assembled as illustrated in FIG. 4A.

The valve 10b includes an annular seat-seal generally designated by the reference character 160. The seat-seal 160 includes an L-shaped reinforcing member 162 having an annular portion 164 that has an outside diameter sized to slidably fit within the bore 154 and a radially inwardly extending portion 166. A resilient seal member 168 is disposed within the reinforcing member 162 and includes a surface 170 thereon that is configured to sealingly engage the exterior surface of the valve ball 40.

FIG. 4 illustrates the ball valve 10b in the assembled position just prior to tightening the threaded fasteners 18 so that the seal 158 is in the unstressed or undeformed condition. A space G, existing between the end face 72 on the downstream connection member 16 and the end face 152 on the valve body 150, is greater than a space H between the seal 158 and the flange portion 166 of the reinforcing member 162. Due to the relative sizes of the spaces G and H, the seal 158 is subjected to deformation within the bore 154 of the valve body 150 adjacent the seat-seal 160.

When the threaded fasteners 18 are tightened, bringing the end face 72 of the downstream connecting member 16 into engagement with the end face 152 on the valve body 150 as illustrated in FIG. 4A, the seal 158 is deformed into engagement with the seat-seal 160, biasing the seat-seal 160 toward or into initial sealing engagement with the exterior surface of the valve ball 40. Thus, it can be appreciated that the entire compressive load exerted on the valve 10b, due to tightening the threaded fasteners 18, is carried by the engagement of the end face 72 on the downstream connecting member 16 with the end face 152 on the valve body 150. The seal 158 forms a fluid-tight seal between the connecting member 16 and the valve body 150 in the counterbore 156 and also sealingly engages the seat-seal 160 to prevent fluid flow therebetween.

The operation of the ball valve 10b is identical to the operation of the ball valve 10a, that is, the seat-seal 160 is free to slide within the bore 154 to sealingly engage the valve ball 40. On the downstream end of the ball valve 10b which is illustrated in FIGS. 4 and 4A, the valve ball 40 when in the closed position as shown in FIG. 4A, moves toward the downstream connecting member 16 carrying the seat-seal 160 therewith to form a fluid-tight seal between the surface 170 on the seat-seal 160 and the exterior surface of the valve ball 40 and between the seal 158 and the seat-seal 160.

*Embodiment of FIG. 5*

FIG. 5 illustrates another embodiment of ball valve constructed in accordance with the invention and generally designated by the reference character 10c. The ball valve 10c is substantially identical in construction to the ball valve 10, except as will be pointed out hereinafter, and, therefore, the same reference characters are used to identify identical parts previously described.

The ball valve 10c includes a valve body 180 having an end face 182 and a bore 184 extending therethrough and intersecting the end face 182. A counterbore 186 is formed in the bore 184 adjacent the end face 182. The opposite end face (not shown) may be constructed as shown in FIG. 5 or as described in the previous embodiments. A resilient annular seal member 188 is disposed in the valve 10c with its outer periphery disposed in the counterbore 186.

As clearly shown in FIG. 5, the seal 188 includes an annular bead 190 engaging the valve body 180 in the counterbore 196 and an annular bead 192 engaging the end face 72 of the downstream connecting member 16. The main portion of the seal 188 has a thickness K that is substantially equal to the depth J of the counterbore 186.

As illustrated in FIG. 5, the valve 10c is shown in the initial assembled position prior to tightening the threaded fasteners 18. Thus, the seal 188 is shown in its relaxed condition. When the threaded fasteners 18 are tightened, the end face 72 on the downstream connecting member 16 engages the end face 182 on the valve body 180, thus, the compressive load exerted by the threaded fasteners 18 is carried by the valve body 180.

With the end faces 72 and 182 in engagement, the seal 188 is deformed so that a fluid-tight seal is formed between the valve body 180 and the downstream connecting member 16. As previously mentioned, the main portion of the seal 188 is of the same thickness as the depth of the counterbore 186. Therefore, little deformation occurs in the main portion of the seal 188 so that it exerts a very small biasing force on the seat-seal 160. The small force exerted by the seal 188 assures that no deformation will occur in the seat-seal 160.

Operationally, the ball valve 10c functions as previously described in connection with the valve ball 10b and 10a.

*Embodiment of FIG. 6*

FIG. 6 illustrates another embodiment of ball valve also constructed in accordance with the invention and generally designated by the reference character 10d. The ball valve 10d includes a valve body 200 having an end face 202 and a bore 204 extending therethrough intersecting the end face 202. A counterbore 206 is formed in the bore 204 adjacent the end face 202. The counterbore 206 is sized to receive the flange portion 92 of the seat-seal 84.

A resilient annular seal 208 is disposed in the valve 10d between and in juxtaposition with the end face 202 of the valve body 200 and the end face 72 on the downstream connecting member 16. As clearly illustrated in FIG. 6, the annular seal 208 includes an annular recess 210 formed in the surface thereof adjacent the seat-seal 84. The recess 210 has an outside diameter substantially equal to the diameter of the bore 204 and is therefore in engagement with the flange portion 92 securely retaining the seat-seal 84 in the counterbore 206.

When the threaded fasteners 18 are tightened to move the connecting member 16 toward the end face 202 on the valve body 200, the annular seal 208 is deformed to positively assure a fluid-tight seal between the valve body 200 and the connecting member 16. Deformation of the seal 208 during tightening of the fasteners 18, move the seal 208 into engagement with the seat-seal 84 eliminating the recess 210 for all practical purposes. Even though the seal 208 engages the seat-seal 84 upon tightening of the threaded fasteners 18, the force exerted on the seat-seal 84 is extremely small due to the recess 210. The engagement of the flange portion 92 with the valve body 200 in the counterbore 206 limits the movement of the seat-seal 84 toward the valve ball 40.

In operation, the ball valve 10d functions precisely the same as did the ball valve 10. That is, moving the valve ball 40 to the closed position with fluid pressure applied on the upstream side thereof forces the valve ball against the seat-seal 84, moving the seat-seal 84 relatively toward the downstream connecting member 16 against the force exerted thereon by the seal 208. Manifestly, a fluid-tight seal is formed between the seat-seal 84 and the exterior surface of the valve ball 40 and between the seat-seal 84 and the annular seal member 208. Thus, a fluid-tight downstream seal is provided in the ball valve 10d affording a complete shut-off thereof.

It should be pointed out that each embodiment of ball valve described hereinbefore can be manufactured to greater tolerances than usual with presently known ball valve structures due to the provision of the resilient annular seals 78, 82, 158, 188 or 208. Each of these annular seals provides for the initial sealing engagement or at least for biasing the seat-seals toward the valve ball while at the same time permitting downstream movement of the seat-seal with the valve ball. The seals also form a fluid-tight seal between the valve body and the connecting members as previously described. Also, each of the valve structures described, through deformation of the seals, biases the seat-seals relatively toward the valve ball to provide initial sealing engagement and simultaneously limiting the force exerted thereonto avoid deformation of the seat-seals which could ultimately result in seal failure.

One of the primary objects in constructing ball valves for use between flanged connecting members has been to reduce the overall length of the valve structure while maintaining the maximum size of flow port 42 through the valve ball 40. When reinforcing structure are used with the seals, the inwardly extending portion, such as the leg 90 in FIG. 1, must be kept to a minimum thickness T otherwise the valve body will be too long requiring exceptionally long fasteners 18.

Manifestly, if the thickness T is very small the seat-seal structures can be easily deformed when the threaded fasteners 18 are tightened. Thus, valves constructed in accordance with this invention provide a means of reducing or limiting the deforming forces exerted on the seat-seals and, yet, provide some biasing force to initiate sealing engagement between the seat-seals and the valve ball. Therefore, valves constructed as described hereinbefore can be of a minimum length with maximum flow area without sacrificing their ability to seal effectively.

Furthermore, it will be understood that the embodiments described in detail hereinbefore are presented by way of example only and that many changes and modifications can be made thereto without departing from the spirit of the invention or from the scope of the annexed claims.

What I claim is:
1. A valve comprising:
   a valve body having an upstream end face, a downstream end face, and a bore extending therethrough intersecting said end faces;
   a valve member movably located in said valve body, said valve member being movable from a position opening said bore to a position closing said bore;
   an annular seat-seal member disposed in said valve body and encircling a portion of said bore, said seat-seal member having a surface thereon arranged to sealingly engage said valve member;
   an annular seal member in juxtaposition with, and sealingly engaging, at least a portion of one of said end faces and in engagement with said seat-seal member, said annular seal member having a recess in the face thereof adjacent the end face on said valve body, said recess having a diameter substantially equal to the diameter of said bore.

2. A ball valve comprising:
   a valve body having an upstream end face, and a downstream end face and a bore extending therethrough intersecting said end faces;
   a spherical valve member movably located in said bore and having an aperture extending therethrough, said valve member being rotatable from a position wherein said aperture is aligned with said bore to a position wherein said aperture and bore are disaligned and movable along said bore when said aperture and bore are disaligned;
   rotating means operably connected with said valve member for rotating said valve member between said positions;
   an annular seat-seal member disposed in said valve body and encircling a portion of said valve body, said seat-seal member having a surface thereon arranged to sealingly engage said spherical valve member;
   an annular seal member in juxtaposition with, and sealingly engaging, at least a portion of one of said end faces and in engagement with said annular seat-seal member, said annular seal member including an annular rigid member covered by a resilient material; and
   a connecting member having an opening extending therethrough in alignment with said bore, and having an end face sealingly engaging said annular seal member, said connecting member deforming a portion of said annular seal member to bias said annular seat-seal member toward said spherical valve member.

3. A ball valve comprising:
   a valve body having an upstream end face, a downstream end face and a bore extending therethrough intersecting said end faces, said valve body having a counterbore adjacent one end face thereof;
   a spherical valve member movably located in said bore and having an aperture extending therethrough, said valve member being rotatable from a position wherein said aperture is aligned with said bore to a position wherein said aperture and bore are disaligned, and being movable along said bore when said aperture and bore are disaligned;
   rotating means operably connected with said valve member for rotating said valve member between said positions;
   a relatively rigid annular member having a pair of leg portions of generally L-shaped cross-section, one of said leg portions being slidingly disposed in said bore and the other said leg portion extending radially inwardly therefrom adjacent said one end face of said valve body, said rigid annular member having a radially outwardly extending flange portion slidingly disposed in said counterbore;
   a resilient annular member located in said rigid annular member and including a frusto-spherical surface thereon arranged to sealingly engage said valve member;
   an annular seal member disposed in juxtaposition with and sealingly engaging at least a portion of said one end face and in engagement with said rigid annular member, said annular seal member having a recess in the face thereof adjacent said one end face, said recess having a diameter substantially equal to the diameter of said bore; and
   a connecting member having an opening extending therethrough in alignment with said bore, and having an end face sealingly engaging said annular seal member; said connecting member deforming a portion of said annular seal member to bias said resilient annular member toward said spherical valve member.

References Cited

UNITED STATES PATENTS 3,199,528  8/1965  Oetjens _____ 137—329.01
3,037,738  6/1962  Jackson et al. _____ 251—172

FOREIGN PATENTS 1,376,015  12/1964  France.
  619,659  11/1932  Germany.
  883,374   6/1953  Germany.
  595,562     1959  Italy.

M. CARY NELSON, *Primary Examiner.*

MICHAEL O. STURM, *Assistant Examiner.*

U.S. Cl. X.R.

251—175, 315